US012809122B2

(12) United States Patent
Mottola et al.

(10) Patent No.: US 12,809,122 B2
(45) Date of Patent: Nov. 24, 2026

(54) COMPONENT-INTEGRATED SURFACES TO FACILITATE ADHESIVE CURING IN COMPACT SCAN ENGINES

(71) Applicant: ZEBRA TECHNOLOGIES CORPORATION, Lincolnshire, IL (US)

(72) Inventors: Michael A. Mottola, Sayville, NY (US); Carl D. Wittenberg, Water Mill, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 1002 days.

(21) Appl. No.: 17/977,042

(22) Filed: Oct. 31, 2022

(65) Prior Publication Data

US 2024/0142751 A1 May 2, 2024

(51) Int. Cl.
*G02B 7/182* (2021.01)
*G02B 5/10* (2006.01)
*G02B 27/62* (2006.01)

(52) U.S. Cl.
CPC ............... *G02B 7/182* (2013.01); *G02B 5/10* (2013.01); *G02B 27/62* (2013.01)

(58) Field of Classification Search
None
See application file for complete search history.

(56) References Cited

U.S. PATENT DOCUMENTS 10,652,441 B1 * 5/2020 Tillotson ................ G02B 7/021
2006/0119805 A1 * 6/2006 Wittenberg .......... H04N 9/3129 353/100
2015/0144699 A1 * 5/2015 Sackett .............. G06K 7/10722 235/462.24
2019/0294840 A1 * 9/2019 Drzymala .............. G02B 7/022
2022/0130880 A1 * 4/2022 Matsugai ................ B29C 33/42

FOREIGN PATENT DOCUMENTS

WO WO-2009058556 A1 * 5/2009 ......... G02B 27/4255

* cited by examiner

*Primary Examiner* — Jyotsna V Dabbi

(57) ABSTRACT

A scan engine for capturing images of an object appearing in an imaging field of view (FOV) includes a chassis including a chassis body defining at least one confined volume, an adhesive material, and an aiming system that generates a cosmetic pattern to assist with identifying the FOV. The chassis body includes a chassis mounting portion and a redirecting region that at least partially surrounds the chassis mounting portion. The adhesive material is disposable on the chassis mounting portion. The aiming system is at least partially disposed within the at least one cavity of the body and extends along a longitudinal axis in a first direction. At least a portion of the aiming system engages the adhesive material to be at least partially retained within the at least one confined volume of the body. Upon directing electromagnetic radiation towards the at least one confined volume, the redirecting region redirects the electromagnetic radiation towards the adhesive material to initiate a curing process.

6 Claims, 10 Drawing Sheets

COMPONENT-INTEGRATED SURFACES TO FACILITATE ADHESIVE CURING IN COMPACT SCAN ENGINES

BACKGROUND

Industrial scanners and/or barcode readers may be used in warehouse environments and/or other environments and may be provided in the form of mobile scanning devices. These scanners may be used to scan barcodes and other objects. Such scanners are typically contained within a chassis to ensure optical components are protected from bumps, falls, and/or other potentially damaging events. In some environments, high powered scanners capable of scanning or resolving barcodes (e.g., 100 ml wide) across a wide range of distances, such as from inches to tens of feet, or more, may be desirable. These scanners also must operate over a range of field of views (FOVs) and often require illumination systems and aiming pattern systems. Often, such systems do not have effective illumination and/or aiming over the entire range of wide FOVs required for operation. Additionally, such systems require larger optics in order to meet performance requirements, but there remains a compromise between the lens systems and optics having a specific size while being constrained by the overall dimensions of the housing and the chassis. Long-range barcode reading applications such as warehouses typically require narrow FOVs, long effective focal lengths, large imaging sensors, and large optical lens for imaging which may all increase the overall size of a scanner or reader. Further, larger systems may generate larger mechanical securing forces that could potentially damage the chassis or other components. Also, compact imaging systems require high precision alignment of optics to prevent optical distortion, which can result in reduced efficiency of scanning rates, or faulty equipment. Additionally, existing systems may incorporate components having transparent or translucent material characteristics. During assembly of such devices, such material characteristics may permit light or other electromagnetic radiation to pass therethrough to initiate and/or begin an adhesive curing process to couple components with each other. However, such assembly processes may not be viable when using specific components and/or if such components are dimensioned in a way that prevent light or other electromagnetic radiation to contact the adhesive material.

Accordingly, there is a need for improved accessories having improved functionalities.

SUMMARY

Scan engines are disclosed herein. A scan engine for capturing images of an object appearing in an imaging field of view (FOV) includes a chassis including a chassis body defining at least one confined volume, an adhesive material, and an aiming system that generates a cosmetic pattern to assist with identifying the FOV. The chassis body includes a chassis mounting portion and a redirecting region that at least partially surrounds the chassis mounting portion. The adhesive material is disposable on the chassis mounting portion. The aiming system is at least partially disposed within the at least one cavity of the body and extends along a longitudinal axis in a first direction. At least a portion of the aiming system engages the adhesive material to be at least partially retained within the at least one confined volume of the body. Upon directing electromagnetic radiation towards the at least one confined volume, the redirecting region redirects the electromagnetic radiation towards the adhesive material to initiate a curing process.

In some examples, the aiming system may block electromagnetic radiation traveling in a direction parallel to the longitudinal axis of the aiming system from contacting the adhesive material. In these and other examples, the redirecting region may include at least one surface having a parabolic shape forming a focal point at the adhesive material. In some forms, the redirecting region may include at least one surface having a surface roughness of approximately 0.8 microns.

In some forms, the aiming system may include an opaque lens housing formed from a polycarbonate material. Further, in some examples, the scan engine may include an imaging assembly that is operably coupled with the body of the chassis. In yet other examples, the electromagnetic radiation may be in the form of a light source or a heating element.

In accordance with a second embodiment, a scan engine for capturing at least one image of an object appearing in an imaging field of view (FOV) includes a chassis, an adhesive material, and a first object. The chassis includes a chassis body defining at least one confined volume and includes a chassis mounting portion and a redirecting region that at least partially surrounds the chassis mounting portion. The adhesive material is disposable on the chassis mounting portion. The first object is at least partially disposed within the at least one confined volume of the body and has a body. At least a portion of the body of the first object engages the adhesive material to be operably coupled with the chassis body within the at least one confined volume thereof. Upon engaging the adhesive material, the first object blocks electromagnetic radiation from contacting the adhesive material from a first direction. Upon directing electromagnetic radiation towards the at least one confined volume in the first direction, the redirecting region redirects the electromagnetic radiation towards the adhesive material to initiate a curing process.

In accordance with a third embodiment, an approach for assembling a scan engine for capturing at least one image of an object appearing in an imaging field of view (FOV) is provided that includes providing a chassis including a chassis body defining at least one confined volume, a chassis mounting portion, and a redirecting region that at least partially surround the chassis mounting portion. The approach further includes providing an aiming system that generates a cosmetic pattern to assist with identifying the FOV and extending along a longitudinal axis in a first direction. An adhesive material is disposed on the chassis mounting portion or a portion of the aiming system. The aiming system is positioned within the at least one confined volume of the body. At least a portion of the aiming system or the chassis mounting portion is engaged with the adhesive material, and electromagnetic radiation is directed towards the at least one confined volume, whereupon the redirecting region redirects the electromagnetic radiation towards the adhesive material to initiate a curing process.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
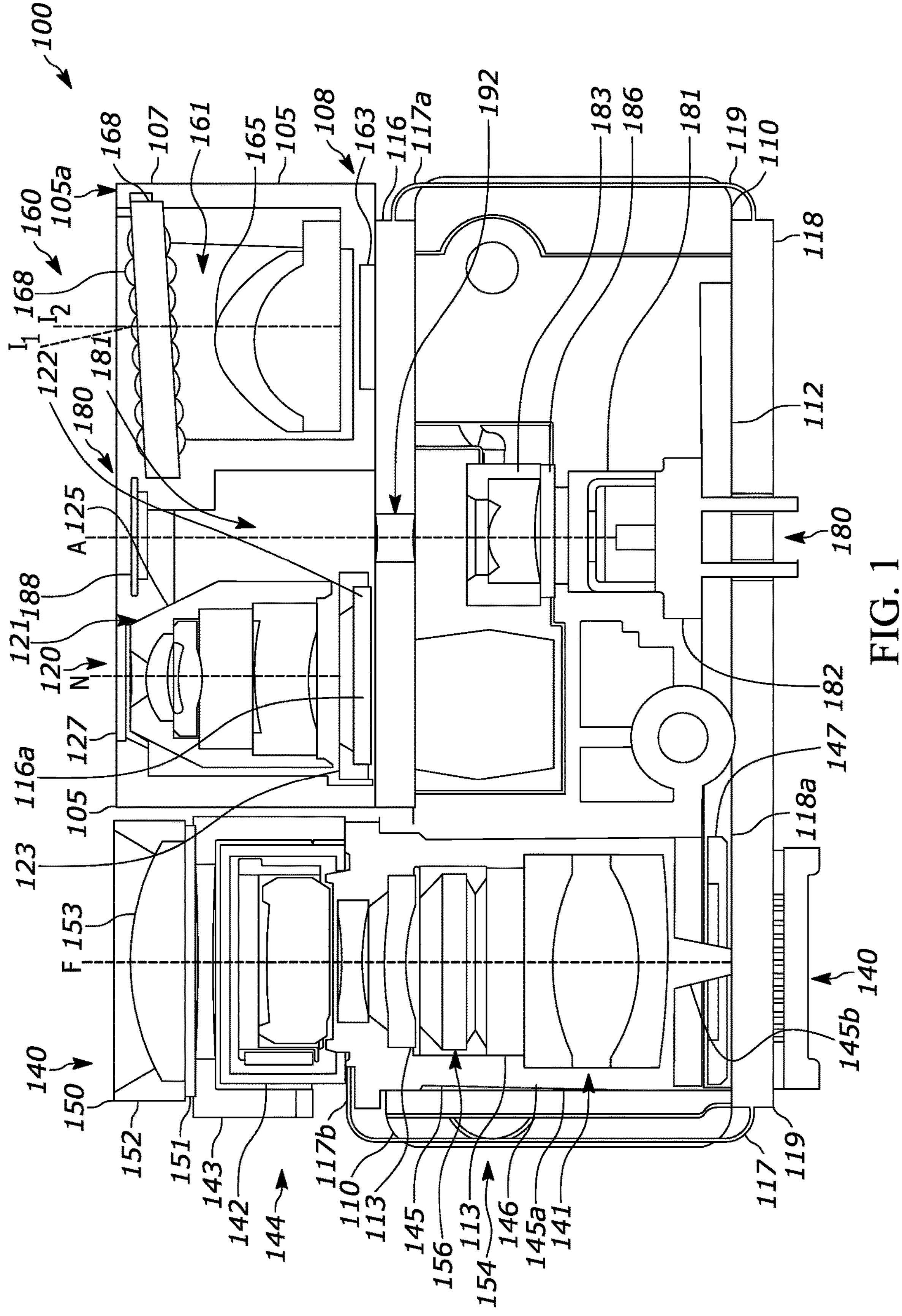
FIG. 1 illustrates a front elevation view of an example imaging assembly of an example scanner for capturing images of an object in accordance with various embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Generally speaking, pursuant to these various embodiments, a compact high-performance autofocus barcode scanner is provided having reduced dimensional requirements, and a broad range of autofocus distances with multiple fields of view (FOVs). More specifically, the scanners described herein may be operably coupled with a support chassis while making use of all of the available height within the scanner housing. Notably, the imaging lens system is positioned adjacent to the chassis (as compared with systems where the imaging lens is positioned within the chassis). As such, the imaging lens system is not constrained by an upper height (i.e., a vertical) dimension of the chassis, and can be dimensioned to occupy the entire vertical dimension. The scanner may therefore incorporate larger, higher-powered optical units capable of resolving barcodes disposed at greater distances, and greater ranges of distances, from the scanner. The positioning of an illumination system allows for more even illumination of targets across the range of autofocus distances and the multiple FOVs. Additionally, the positioning of the aiming pattern generation system further reduces parallax and allows for more accurate positioning of an aiming pattern in FOVs at far ranges from the imaging system. A rigid-flexible printed circuit board removes the requirement for other ports and electrical interconnects which also allows for a reduction in the size of the systems to enable the fabrication of compact imagers and scanners described herein.

Turning to the figures, an assembly 100 or scan engine for capturing at least one image of an object appearing in an imaging field of view (FOV) is provided. The assembly 100 includes a first chassis 105 having a body 107 defining at least one cavity for containing one or more components for performing imaging of an object or target in a FOV. The assembly 100 further includes a second chassis 110 including a body 112 defining at least one cavity for containing components for performing imaging on a target in a FOV of the scan engine. The first chassis 105 has a chassis mounting portion 108 for mounting the first chassis 105 to the second chassis 110. The chassis mounting portion 108 may include one or more pins 115*a* (FIG. 3) or wedges that protrude from the first chassis 105 that fit inside of sockets 115*b* (FIG. 3) on the second chassis 110 to physically align the first chassis 105, and elements of the first chassis 105, with the second chassis 110 and element contained inside of the body 112 of the second chassis 110. As illustrated in FIG. 1, the first chassis 105 is indirectly mounted on the second chassis 110 via a PCB 116 disposed between the first and second chassis 105 and 110. In examples, the first chassis 105 may be directly connected to the second chassis 110, or physically coupled to the PCB 116 that is then physically coupled to the second chassis 110.

In examples, the first chassis 105 may be constructed from a plastic material which reduces the overall weight of the assembly, and the second chassis 110 may be constructed from a metal material to perform as a heat sink for electrical components, optical components, lasers, illumination sources, and the like. In examples, both the first chassis 105 and second chassis 110 may independently be constructed from a plastic, a metal, or another material to fabrication of a lightweight compact imaging scan engine.

The assembly 100 includes a first circuit board 116 disposed adjacent to the first chassis 105 between the first and second chassis 110. The first circuit board 116 may include any number of electrical and/or electro-mechanical components (e.g., capacitors, resistors, transistors, power supplies, etc.) used to communicatively couple and/or control various electrical components of the assembly 100. For example, the first circuit board 116 may include any number of component mounting portions 116*a*, to receive components (e.g., imaging sensors, light emitting diodes, laser diodes, etc.) to operably couple therewith, and may additionally include one or more board mounts used to secure the first circuit board 116 with the first and/or second chassis 105 and 110 (not illustrated).

The assembly further includes a second circuit board 118 disposed adjacent to the second chassis 110 on a side of the second chassis 110 opposite that of the first circuit board 105. The second circuit board 110 may include any number of electrical and/or electro-mechanical components (e.g., capacitors, resistors, transistors, power supplies, etc.) used to communicatively couple and/or control various electrical components of the assembly 100. For example, the second circuit board 118 may include any number of component mounting portions 118*a*, to receive components (e.g., imaging sensors, light emitting diodes, laser diodes, etc.) to operably couple therewith, and may additionally include one or more board mounts (not illustrated) used to secure the second circuit board 118 with the second chassis 110.

While described as first and second circuit boards 116 and 118, in implementation, the first and second circuit boards 116 and 118 may be part of a singular rigid-flexible circuit board 119. The rigid-flexible circuit board 119 includes one or more substantially flexible portions 117*a* and 117*b* that physically and electrically interconnect the first and second circuit boards 116 and 118 with each other, and with additional elements of the assembly 100. In examples, the first and second circuit boards 116 and 118 may be substantially rigid portions of the rigid-flexible circuit board 119 and the flexible portions 117*a* and 117*b* are malleable and bendable portions of the rigid-flexible circuit board 119. In examples, a first flexible portion 117*a* may provide electrical communication between the first and second circuit boards 116 and 118, and a second flexible portion 117*b* provides electrical communication between the second circuit board 118 and an autofocus element 142, discussed further herein. The flexible portions 117 of the rigid-flexible circuit board 119 reduce the number of additional wires and electrical interconnects in the assembly 100 allowing for a simplified electrical structure and reduced overall size of the assembly 100.

In implementation, the flexible portions 117*a* and 117*b* of the rigid-flexible circuit board are disposed outside of the first and second chassis 105 and 110. As illustrated in the figures, the first flexible portion 117*a* is disposed adjacent to, and substantially outside of, the second chassis and interconnects the first and second circuit boards 116 and 118. The second flexible portion 117*b* is disposed outside of, and adjacent to, the second chassis 110 on an opposite side of the second chassis 110 than the first flexible portion 117*a*, and further interconnects the second circuit board 118 and the autofocus element 142. While illustrated as having two flexible portions 117*a* and 117*b* it is envisioned that the rigid-flexible circuit board may include additional flexible portions to provide electrical communication between the circuit boards 116 and 118 and other components of the assembly 100.

The second chassis 110 includes any number of guard protrusions 111 that extend from the sides of the second chassis adjacent to the flexible portions 117*a* and 117*b*. The guard protrusions 111 extend away from the second chassis 110 past the flexible portions 117*a* and 117*b* to provide protection to the flexible portions 117*a* and 117*b*. The guard protrusions 111 prevent the flexible portions 117*a* and 117*b* from coming into physical contact with other objects. For example, the guard protrusions 111 protect the flexible portions 117*a* and 117*b* from impact if the assembly is dropped onto the ground, onto a table, or another surface. Further, the guard protrusions 111 protect the flexible portions 117*a* and 117*b* from physical contact with any objects with dimensions on the order of the size of the flexible portions 117*a* and 117*b*, or in contact with objects with dimensions larger than the size of the flexible portions 117*a* and 117*b*. The guard protrusions may include one or more pins, ridges, beams, flanges, frames, platforms, shoulders, rims, or another physical structure that protrudes past the flexible portions 117*a* and 117*b* away from the second chassis 110.

A near imaging system 120 is disposed in a first cavity 121 of the first chassis 105. The near imaging system 120 is operatively coupled to the first circuit board 116 and is disposed to capture image objects in a near FOV along a near axis of the near imaging system 120. The near imaging system 120 includes near imaging optics 125 and a near imaging sensor 122 for capturing images in the near FOV. The near imaging optics 125 are disposed to receive light through an aperture 127 of the first chassis 105, and the near imaging optics 125 focus the light onto the near imaging sensor 122. In some examples, the near imaging sensor 122 is mounted to or coupled with the first circuit board 116 via a component mounting portion 116*a* of the first circuit board 116. The chassis mounting portion 108 may be mounted to a component mounting portion 116*a* of the first circuit board 116 as well as to the second chassis 110. In examples, the first circuit board 116 may include a bore 116*b* through which the one or more pins 115*a* of the first chassis 105 may be placed to align components of the first chassis 105 (e.g., the near imaging system 120), with component mounts 116*a* and other components disposed on the first circuit board 116. In examples, an adhesive, screws, pins, or another physical element may be used to mount the first chassis 105 to the first circuit board 116. Additionally, thermal paste or a thermal conduit may be used to couple the first chassis 105 and the first circuit board 116 to provide a thermal pathway flow from elements contained in the first chassis 105 to the second chassis 110 or another heat sink. The component mounting portion 116*a* may include an adhesive to assist in securing the imaging sensor cap 123 to the circuit board 116. In other examples, the component mounting portion 116*a* may include any number of electrical interconnects that receive corresponding electrical interconnects disposed or otherwise coupled with the circuit board 116. Other examples are possible.

The illumination system 160 is disposed in a second cavity 161 of the first chassis 105. The illumination system 160 includes an illumination source 163 disposed on the first circuit board 116. The illumination source 163 is disposed to provide illumination along both a near illumination axis $I_1$ and a far illumination axis $I_2$. The illumination source 163 may include a single light emitting diode (LED) or light source, or may include multiple LEDs or light sources to provide the illumination along both the near and far illumination axis $I_1$ and $I_2$. While described as using LEDs to provide the illumination, the illumination source 163 may alternatively, or additionally, include one or more laser diodes (LDs), black body radiation sources, incandescent sources, or another light source to provide radiation along the near and far illumination axes $I_1$ and $I_2$. For simplicity and clarity, the illumination source 163 will be described herein as having two LEDs 163*a* and 163*b* disposed adjacent each other on the first PCB 116 to independently provide illumination along the near and far illumination axes $I_1$ and $I_2$. The LEDs includes a far illumination source 163*a* and a near illumination source 163*b* LED disposed along respective far and near illumination fields $I_1$ and $I_2$ to provide light along respective illumination axes. As such, the illumination source 163 may be referred to herein as a dual illumination source 163, but it should be understood, in examples, that the illumination source 163 could include only a single light source, or more than two light sources.

The illumination system 160 further includes illumination optics to provide the illumination to the one or more FOVs of the assembly 100. The illumination system 160 includes a collimator 165 that collimates the illumination light provided by the illumination source 163. In examples, the collimator 165 may be a dual lens collimator with each lens disposed along respective near and far illumination axes $I_1$ and $I_2$ to collimate light from the two independent LEDs of the dual illumination source 163. A dual optical element 168 is disposed along both the near and far illumination axes $I_1$ and $I_2$ to focus the illumination from the illumination source 163 into the near and far fields of view to illumination an object in either of the near and/or far fields of view of the imaging assembly 100. The dual optical element 168 is a substrate that includes a transparent window 168*a* at one region of the dual optical element, and a microlens array (MLA) 168*b* disposed at another region of the dual optical element 168, with the regions of the transparent window 168*a* and MLA 168*b* disposed adjacent to each other. The transparent window 168*a* is a material or aperture that allows light to propagate through the transparent window 168*a* without altering the axis of propagation of the light, or change a focus of the light propagating through the transparent window 168*a*. The transparent window 168*a* is disposed along the far illumination axis $I_2$ and allows illumination to propagate through the window 168*a* along the far illumination axis $I_2$ to illuminate an object in the far FOV. The micro-lens array (MLA) 168*b* is disposed along the near illumination axis $I_1$, and the MLA 168*b* focuses illumination from the illumination source 163 into the near FOV to illuminate an object in the near FOV of the imaging assembly 100. As such, the illumination system 160 provides illumination to both the near and far FOVs of the imaging system 100. In examples, the MLA 168*b* tilts the propagation of light, and therefore the near illumination axis, by greater than 2° relative to the far illumination axis. In implementations, the near illumination axis may be tilted by more than 3°, 5°, 7° or greater than 9° relative to the near illumination axis. In examples, the far illumination illuminates a FOV of less than 25° by 25°, and the near illumination may illuminate a FOV of greater than 50° by 30°.

A far imaging system 140 is disposed in a first cavity 141 of the second chassis 110. In the illustrated example, the far imaging system 140 is operably coupled with the second circuit board 118. The far imaging system 140 includes an autofocus system 142 and a rear lens assembly 145, both containing lenses for imaging. The autofocus system 142 is positioned adjacent to and/or operably coupled with the rear lens assembly 145. The rear lens assembly 145 is in the form of a generally hollow body that may have any number of features such as shapes and/or cutouts 113 such that corresponds to the shape of the lens or lenses disposed therein. These cutouts 113 reduce overall weight of the rear lens assembly 145, and due to the uniform thickness of a sidewall 146*a*, the rear lens assembly 145 is easier to manufacture (e.g., mold via an injection molding or other forming machine) as compared with lens holders having varying thickness.

In some examples, the rear lens assembly 145 is coupled with the second circuit board 118 via a component mounting portion 118*a* on the second circuit board 118. As a non-limiting example, the component mounting portion 118*a* may be in the form of a pad to which the rear lens assembly 145 is pressed onto. The component mounting portion 118*a* may include an adhesive to assist in securing the rear lens assembly 145 to the second circuit board 118. In other examples, the component mounting portion 118*a* may include any number of electrical interconnects that receive corresponding electrical interconnects disposed or otherwise coupled with the rear lens assembly 145. The second circuit board 118 may have any number of component mounting portions 118*a* with throughholes, mounting pads, etc. for mounting elements to the second circuit board 118. Other examples are possible.

A far imaging sensor 147 is disposed on the second circuit board 118, with the far imaging sensor 147 disposed along a far imaging axis F of the imaging assembly 100. The far imaging sensor 147 images one or more FOVs further from the imaging assembly 100 than the FOV(s) of the near imaging assembly 120. The autofocus system 142 includes a variable focus optical element that may change the focal distance of the far imaging system 140 to image different imaging planes at different focal lengths. The autofocus system 142 may include a deformable lens element, a liquid lens, a T-lens, a voice coil motor, voice coil actuator, or another variable focus optical element. The far imaging system 140 includes a front lens 150 disposed along the far imaging axis F outside of the second chassis 110.

An aiming system 180 is partially disposed in aiming cavities 181 of both the first and second chassis 105 and 110. An aiming source 182 is disposed on the second circuit board 118, with the aiming source in the cavity 181 of the second chassis 182, the aiming source 182 configured to provide aiming light along an aiming axis A. Various optics are disposed along the aiming axis A to manipulate the aiming light as the light propagates through the cavity of the second chassis 105. The aiming light propagates through a bore hole 192 in the first circuit board 116, and continues to propagate through the aiming cavity 181 in the first chassis 105. In examples, the aiming cavity 181 in the first chassis 105 is substantially cylindrical to act as a tunnel, as an aiming light path cavity, through which the aiming light may be transmitted. An aiming diffractive optical element (DOE) in the form of a pattern generator 188 is disposed in the aiming cavity 181 of the first chassis, with the pattern generator 188 disposed along the aiming axis A to manipulate the aiming light to form an aiming pattern. The aiming pattern generator 188 may be a diffractive optical element, or a refractive optical element for forming the aiming pattern. Positioning the aiming light source 182 in the second chassis 110 and the pattern generator 188 at a distant side 105*a* of the first chassis 105 allows for the spacing of the various systems (e.g., near imaging system 120, aiming system 180, and illumination system 160) to be closer together in the assembly 100 reducing the overall size of the assembly 100.

Figure 2:
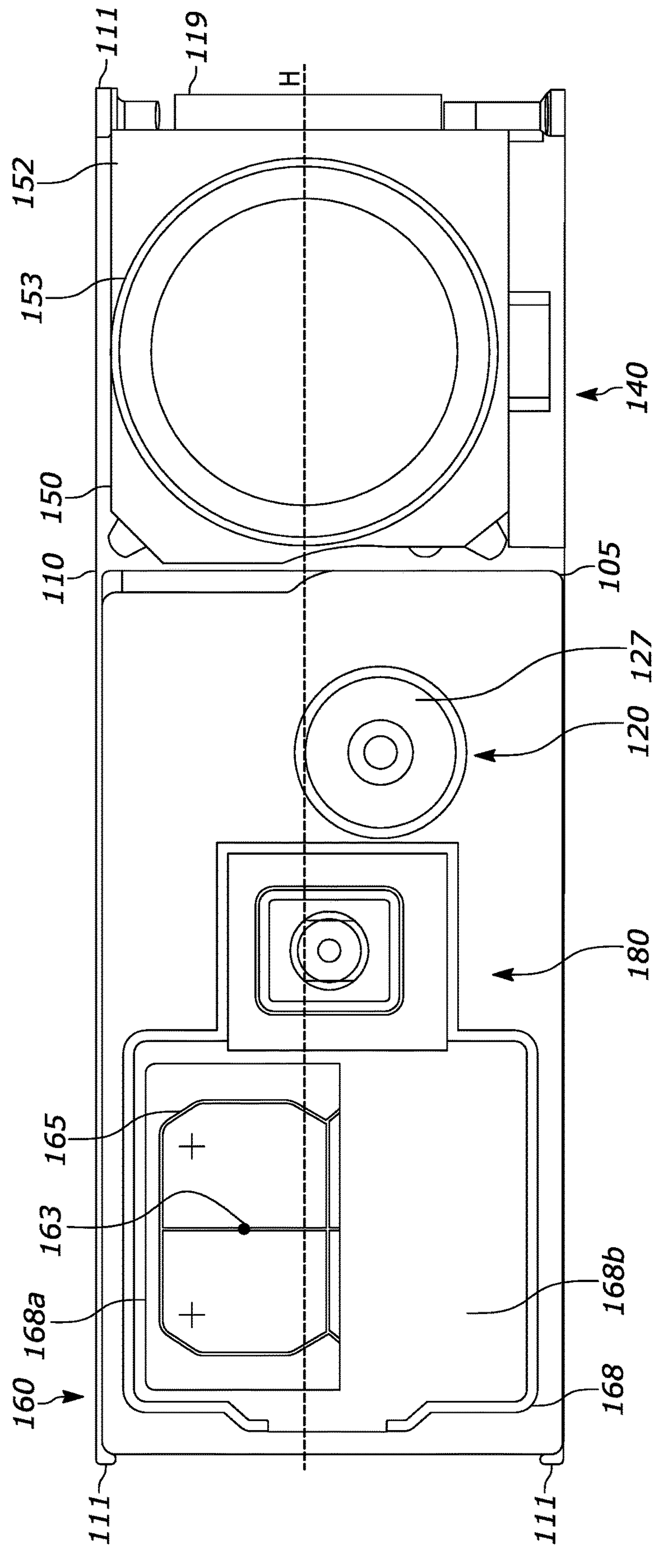
FIG. 2 illustrates a side elevation view of the example imaging assembly of an example scanner of FIG. 1 for capturing images of an object in accordance with various embodiments.
Figure 3:
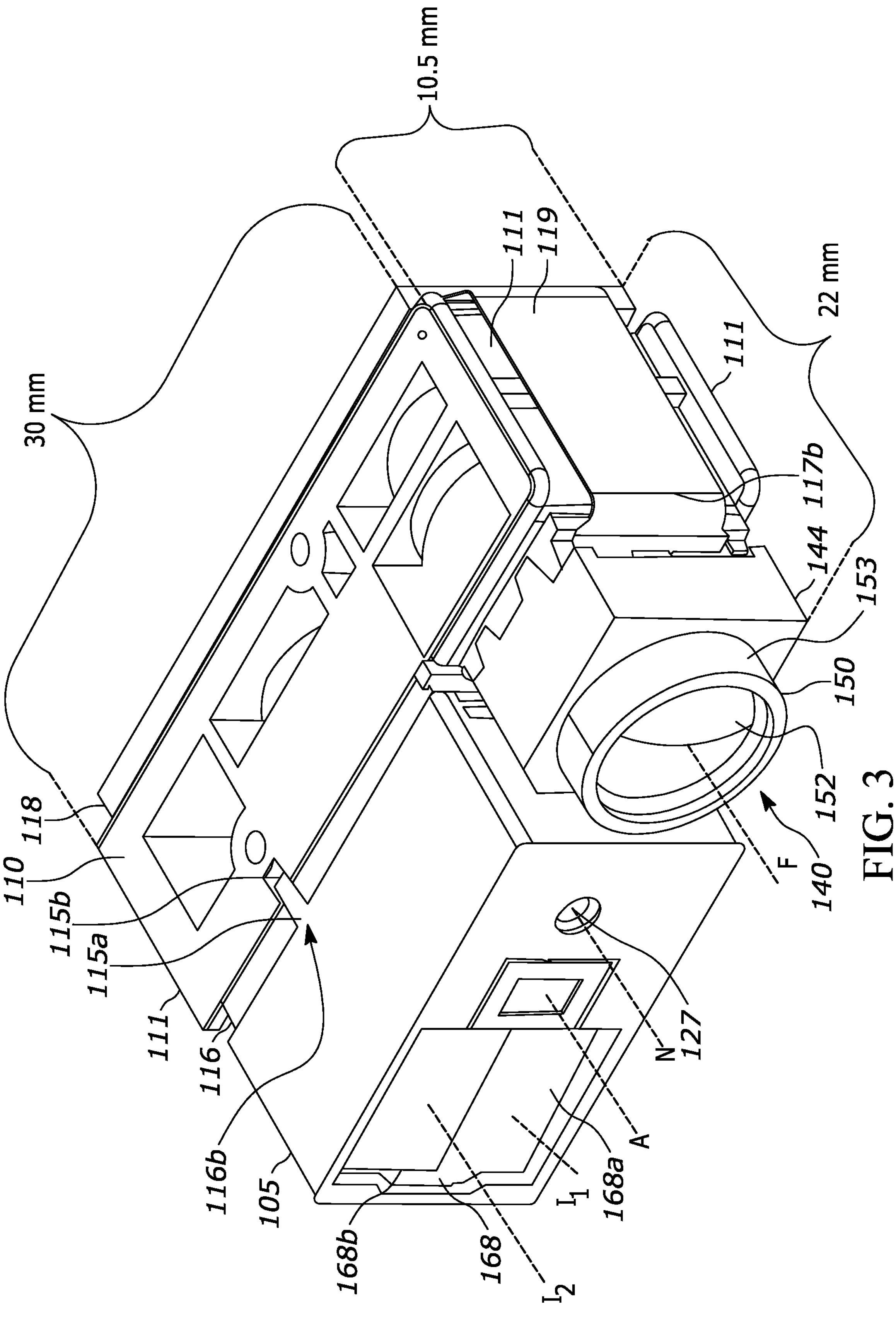
FIG. 3 illustrates a perspective view of the example imaging assembly of FIGS. 1 and 2 in accordance with various embodiments.
Figure 4:
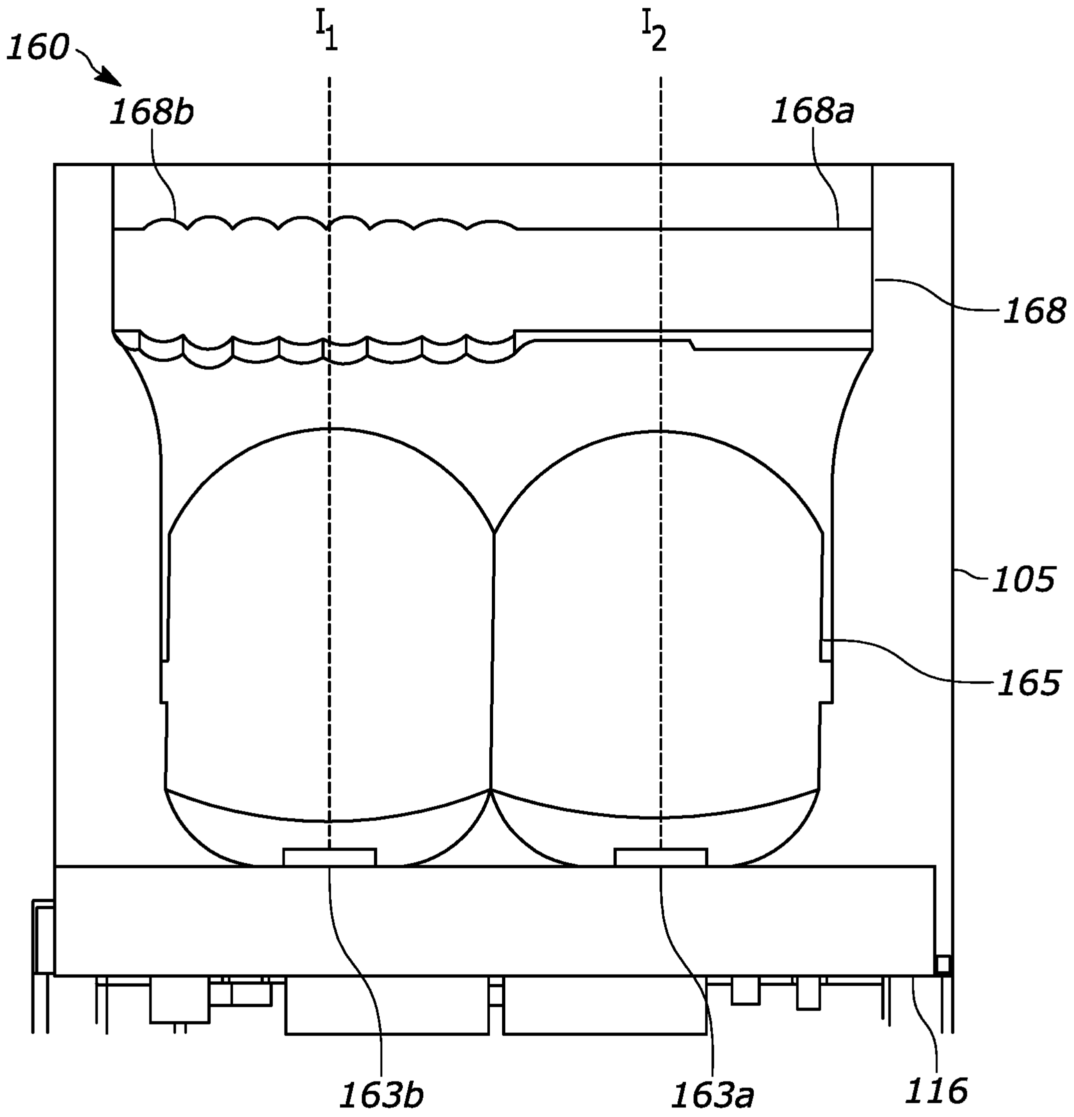
FIG. 4 illustrates a side view of an example illumination system that may be implemented in an imaging assembly in accordance with various embodiments.

As illustrated in FIGS. 2 and 3, the near imaging system 120, far imaging system 140, illumination system 160 and aiming system 180 are positioned substantially along a same horizontal axis H. Placing the illumination and aiming systems 180 and 160 along a same axis as the near and far imaging systems 120 and 140 allows for simplified optical designs which further reduces required alignment and tuning to provide the illumination and aiming pattern to the near and far FOVs of the assembly 100. Additionally, having all of the systems 120, 140, 160, and 180 roughly along a same horizontal axis reduces the overall height of the imaging assembly 100. In examples shown herein, such as in FIG. 2, the illumination system 120 and aiming system 180 are along the same horizontal axis H centered on the second chassis 110, while the near imaging system 120 is offset of the horizontal axis in one direction, and the far imaging system 140 is offset from the horizontal axis in an opposite direction than that of the near imaging system 120. Each of the near and far imaging systems 120 and 140 have a larger dimension of the respective near and far FOVs along the horizontal axis H. In examples, the near imaging system 120 is disposed adjacent to the aiming system 180 on a side of the aiming system 180 opposite the illumination system 160, and the far imaging system 140 is disposed adjacent to the near imaging system 120 on a side of the near imaging system 120 opposite the aiming system 180.

Figure 5:
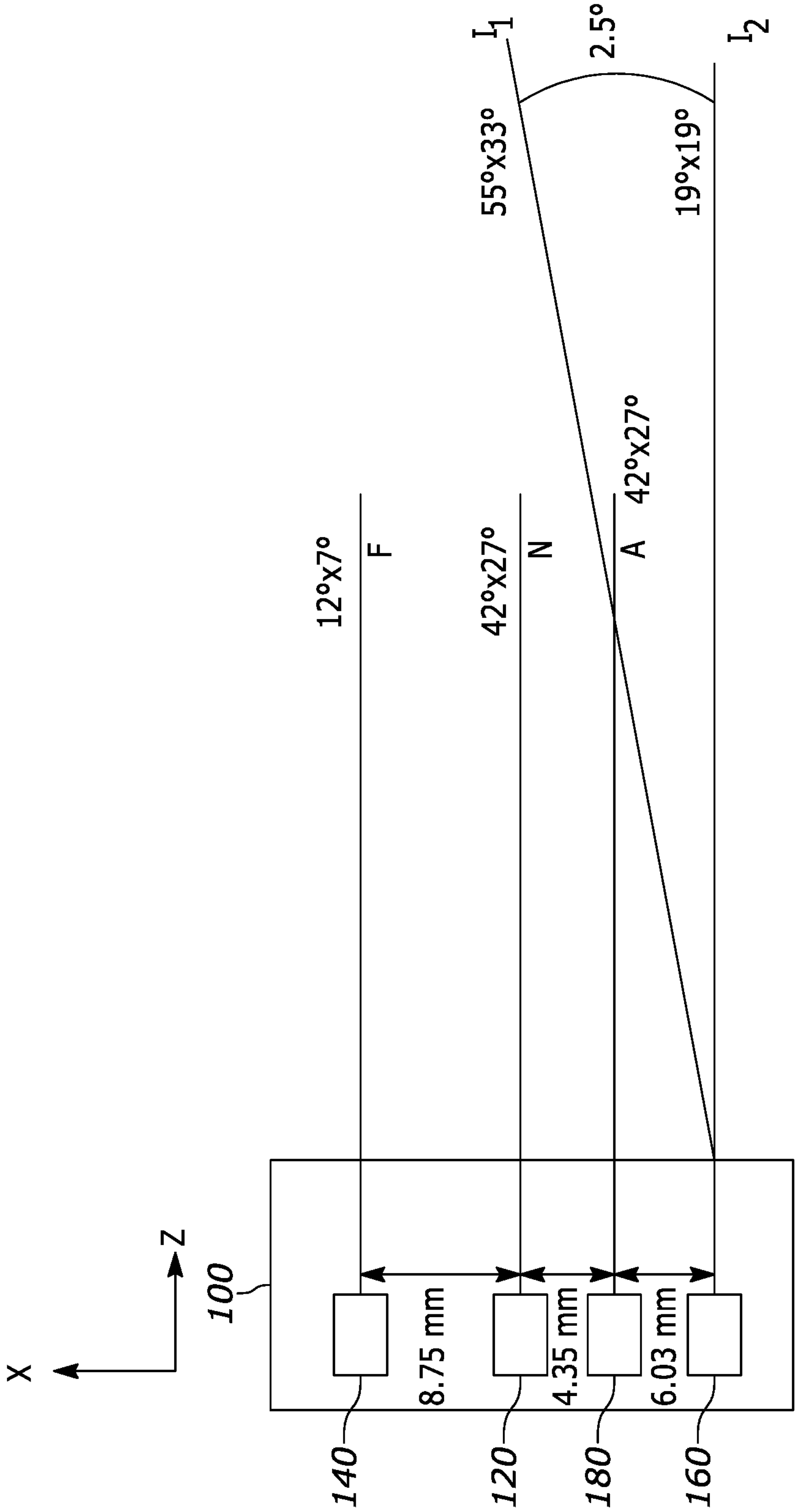
FIG. 5 is a diagram of imaging axes and illumination propagation axes of the example imaging assembly of FIGS. 1-3 in accordance with various embodiments.

FIG. 5 is a diagram showing the various imaging axes, and axes of propagation of the systems of the assembly 100 of FIGS. 1-4. In a generic example. All of the far imaging axis F, near imaging axis N, aiming axis A, and far illumination axis $I_2$ are parallel, or substantially parallel (e.g., within 3°, within 5°, or within 10°) of each other. Configuring the aiming axis to be parallel to the imaging systems improves the accuracy of the position of the aiming pattern generated by the aiming system 180 in the FOV of the far imaging FOV at far distances. Placement of the near imaging system 120 next to the aiming system 180 improves accuracy of the position of the aiming pattern generated by the aiming system 180 in the FOV of the near imaging system at close distances. Placement of the far imaging system 140 away from the aiming system 180 increases accuracy of distance ranging based on shift of the aiming pattern in the image of the far imaging system camera. As such, the more accurate placement of the aiming pattern allows for more efficient operation, and more accurate scanning of objects presented to the imaging assembly 100. The near imaging system 120 has a broader FOV and therefore allows for, potentially, more undesirable light such as light from the environment, or stray light from the illumination system 160, to enter the near imaging system 120 which may cause noisier images and reduce the efficiency of scanning objects in the near FOV of the assembly 100. Positioning the aiming system 180 between the near imaging system 120 and the illumination system 160 reduces the noise in the near imaging system 120 due to the illumination system 160. The MLA **168*b*** focuses the near illumination at an angle along the near illumination axis $I_1$. Tilting the near illumination along the near illumination axis $I_1$ allows for illumination of objects at distances closer to the assembly than the far FOV illuminated by the far illumination.

In an example, the far imaging sensor 147 may be a 3.8×2.4 mm active area photodiode, and the near imaging sensor may be a 4.8×2.7 mm photodiode. The resulting far imaging FOV is a 12° by 7° field of view and the resulting near imaging FOV is a 42° by 27° field of view. In examples, the near imaging system 120 may have a FOV of greater than 42° by 25°, and the far imaging system may have a FOV of less than 15° by 10°. The aiming pattern may be provided by a collimated and patterned beam with a collimated beam size of 1×1.4 mm provided to the far imaging FOVs and the patterned beam with aiming FOV of 42° by 27° to the near imaging FOV. The far illumination with a collimated beam size of 5.6×3.8 mm out of the collimator 165 results in illumination in a 19° by 19° FOV in the far imaging FOVs. After passing through the MLA **168*a*, the near illumination provided by the illumination system 160 illuminates a 55° by 33° FOV in the near imaging FOV. In the current example, the near illumination axis $I_1$ is at an angle of 2.5° tilt as compared to the other imaging and illumination axes of the assembly 100. The resulting overall size of the assembly 100** may be less than 35 mm by 12 mm by 25 mm.

Figure 6:
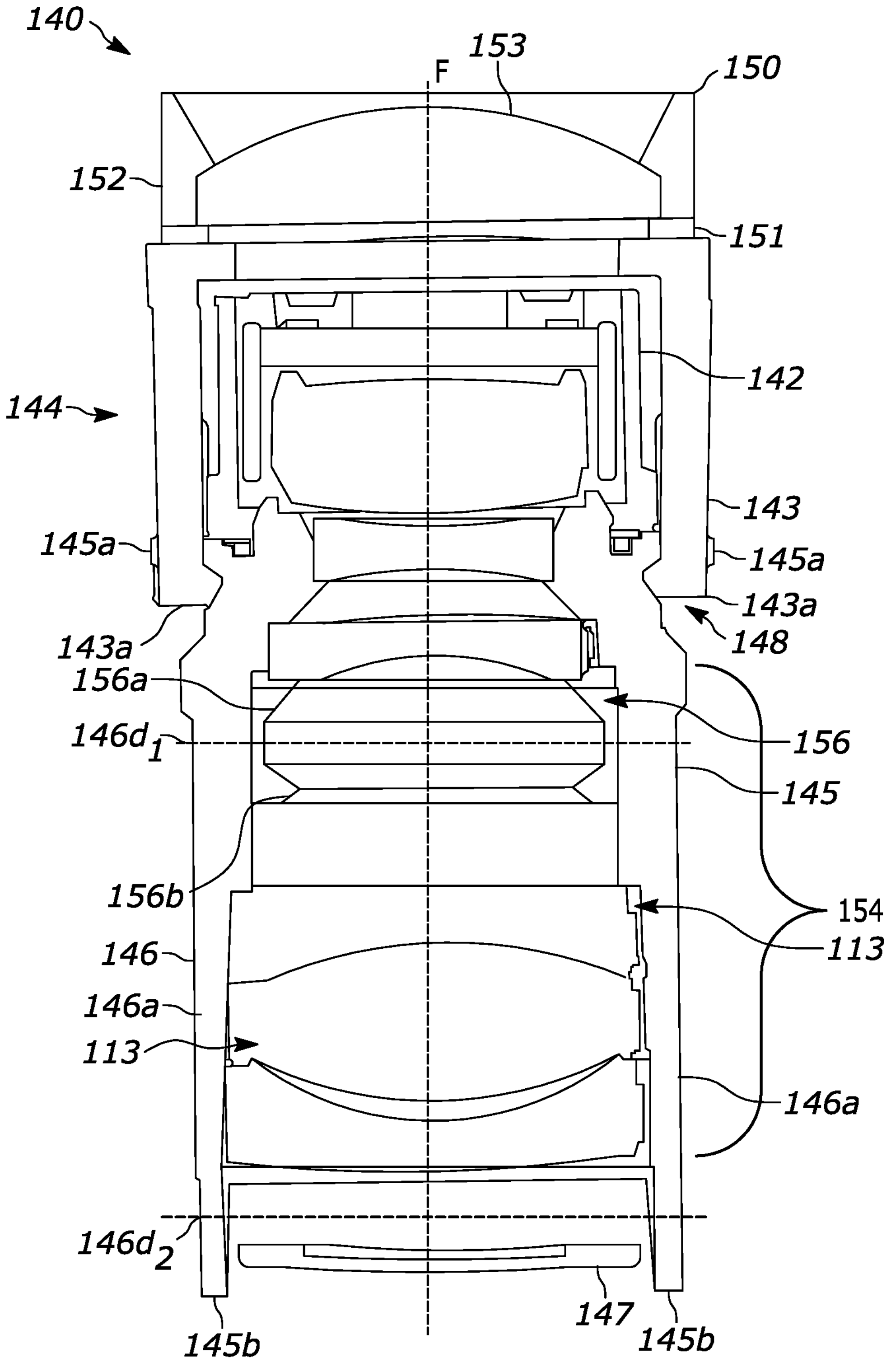
FIG. 6 illustrates a front elevated view of an example far imaging system for the example imaging assembly of FIGS. 1-3 in accordance with various embodiments.
Figure 7:
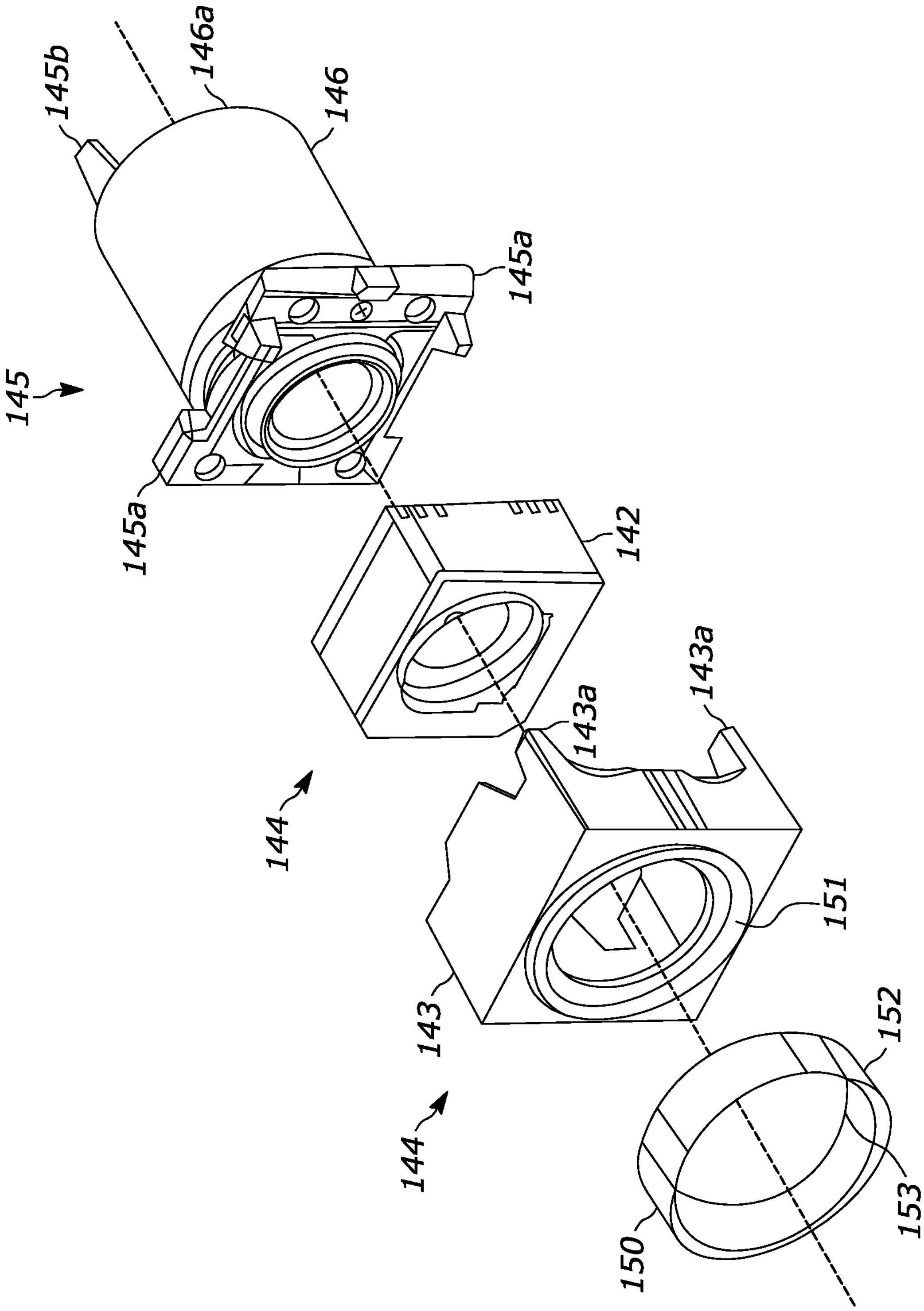
FIG. 7 illustrates an exploded perspective view of the example far imaging system of FIG. 6 in accordance with various embodiments.
Figure 8:
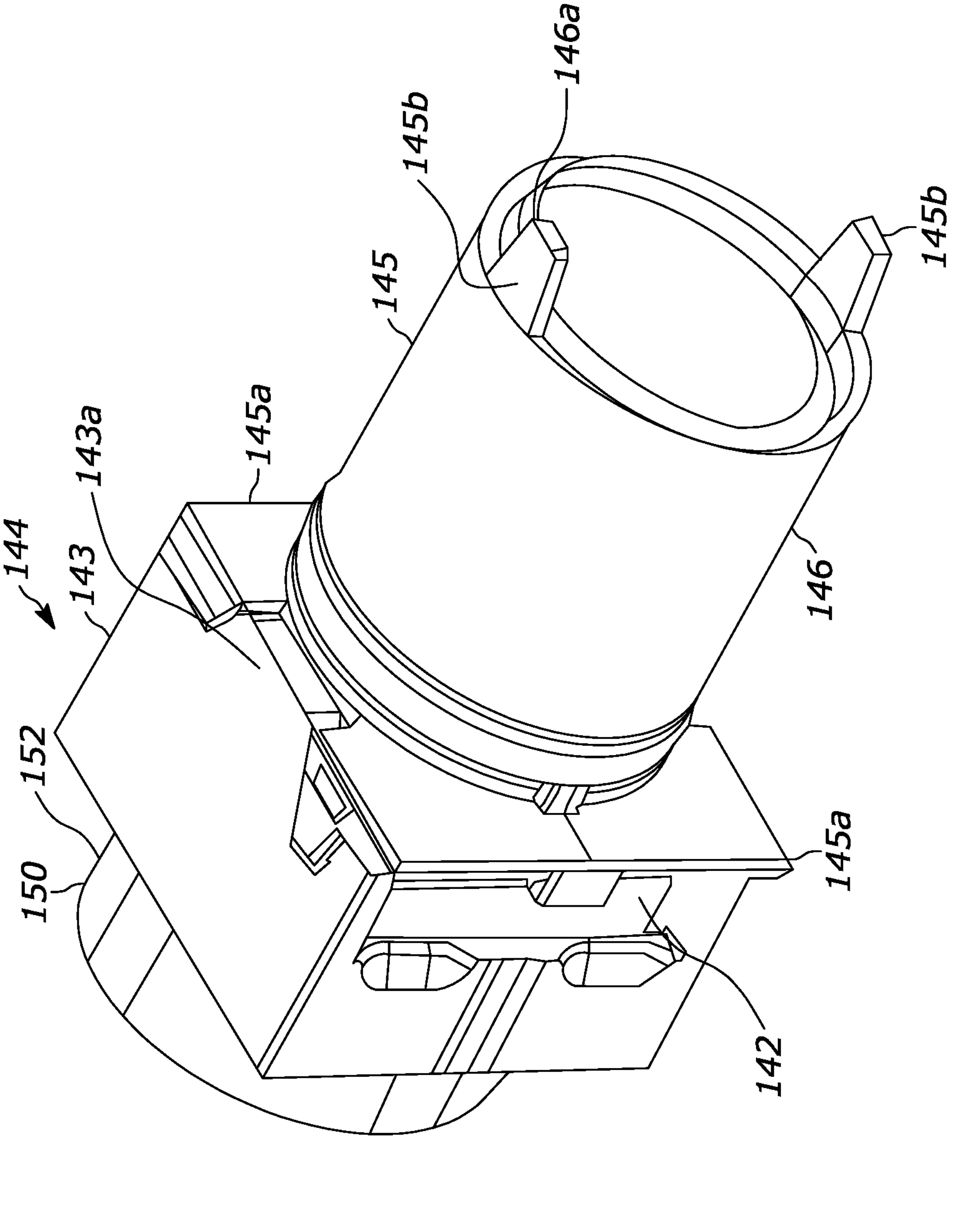
FIG. 8 illustrates a perspective view of the example far imaging system of FIGS. 6 and 7 in accordance with various embodiments.

FIGS. 6-8 illustrate various components of the far imaging system 140 in more detail. As previously described, the far imaging system 140 includes the compensator lens assembly 150, variable focus assembly 144, rear lens assembly 145, and far imaging sensor 147. With brief reference to FIG. 1, The imaging sensor 147 may be physically and operatively coupled to the second circuit board 118. The rear lens assembly 145 has a central lens barrel 146, mounting flanges **145*a*, and mounting tabs 145*b*. The central lens barrel 146 contains a fixed focus optical group 154. The mounting flanges 145*a* extend perpendicularly away from the lens barrel 146 from a first end of the lens barrel 146 and the mounting tabs 145*b* protrude from bottoms of the sidewalls 146*a* on an opposite end of the lens barrel 146 from the mounting flanges 145*a*. The mounting flanges 145*a* physically couple the variable focus optical element housing 143 with the rear lens assembly 145. The mounting tabs 145*b* extend along the direction of the optical axis F and physically couple the rear lens assembly 145 with the second printed circuit board 118 to maintain a position of the lens barrel 146, and optics and elements (i.e., lenses positioned inside of the rear lens assembly 145, the variable focus assembly 144, compensator lens assembly 150, etc) of the far imaging system 140 relative to the far imaging sensor 147**.

In examples, the lens barrel 146 has a first outer diameter 146$d_1$ toward the first end of the lens barrel 146 (i.e., the end having the flanges **145*a*), and the lens barrel 146 tapers to a smaller second outer diameter 146$d_2$ at the second end (i.e., the end having the tabs 145*b*) of the lens barrel 146. Tapering of the outer diameter of the lens barrel allows for the piece to be machined using injection molding. The taper allows for ejection of the molded part from a mold cavity. Further, having two different diameters along the lens barrel 146 allows for control over the tilt and lateral positioning (i.e., directions orthogonal to the optical axis F) of optics housed in the rear lens assembly 145 to tune imaged light onto the far imaging sensor 147. The tapered second outer diameter 146$d_2$ minimizes positioning features for coupling the far lens assembly 140 with the second chassis 110 which reduces physical constrain of the lens assembly 140 during construction, allowing for more physical tunability of the lens assembly 140**.

The fixed focus optical group 154 may include a plurality of lenses disposed in the hollow body of the rear lens assembly 145 to provide an image to the far imaging sensor 147. Cutouts 113 in the cavity of the rear lens assembly 145 may provide physical support to lenses and optics disposed in the rear lens assembly 145 to position the lenses and optics relative to each other, and to other elements of the far imaging system 140. The fixed focus optical group 154 is disposed along the far imaging axis F, and as such, the far imaging axis F may be referred to herein as an optical axis or imaging axis of the far imaging system 140. The fixed focus optical group 154 is disposed to receive light from the variable focus assembly 144 and may include one or more lenses including without limitation, convex lenses, concave lenses, asymmetric lenses, plastic lenses, glass lenses, aspheric plastic lenses, aspheric lenses, field stops, baffles, and/or apertures. The fixed focus optical group 154 is configured to focus the light at the flange focal length of 18.766 mm of the far imaging system 140 optical assembly. The current embodiment has an effective focal length of between 19.47 mm to 19.92 mm depending on various conditions of the optical system. The flange focal length and effective focal length of the system may be tuned on the order of millimeters, to tens of millimeters, to even hundreds of millimeters depending on the optical elements used. The far imaging sensor 147 receives the light at the flange focal distance and generates a signal indicative of the received light to generate an image of an object in the FOV of the far imaging system 140. The far imaging system 140 is installed in the second chassis 110, and, in examples, the second chassis 110 is a zinc alloy having a low thermal coefficient of expansion. The far imaging system 140 is secured to the second chassis 110 at an axial location that minimizes the change in its focal point position relative to the sensor 147, due to changes in temperature which takes advantage of the low coefficient of expansion of the zinc alloy second chassis 110.

In addition to providing physical support for the positions of the fixed focus optical group 154, the rear lens assembly 145 further acts as an optical baffle to reduce stray light in the far imaging system 140. The rear lens holder 154 may include structural features that act as a baffle themselves, or may include a separate element as an optical baffle. In examples, the fixed focus optical group 154 includes an optical baffle 156 disposed along the optical axis F between lenses of the fixed focus optical group 154. The optical baffle 156 may be machined from a metal material, such as a relatively light metal like aluminum, which allows for thinner walls and lighter weight of the baffle 156 allowing for overall smaller dimensions of the far imaging system 140. In examples, the optical baffle 156 may be any material but trade offs in cost, weight, and materials may be considered. A light weight material for the optical baffle 156 reduces the overall risk of failures of adhesive bonds during mechanical shock such as dropping of the assembly 100 or other physical impact to the assembly 100 or far imaging system 140.

The baffle 156 may have an outer diameter of less than less than 6 mm, less than 8 mm, less than 10 mm, or less than 20 mm. In specific examples, the optical baffle 156 has a nominal outer diameter of 5.8 mm. The optical baffle 156 has a first baffle stop edge **156*a* and a second baffle stop edge 156*b*, both of which block stray light from propagating further along the optical axis F. The baffle 156 functions as a field stop that reflects stray light into walls of the baffle 156 and lens barrel 146. The baffle 156 may be covered in a dark coating such as black polish or paint to increase the absorption of light into the walls of the baffle 156 to further reduce stray light in the far imaging system 140**.

The variable focus assembly 144 is physically coupled to the fixed focus optical group 145 at the flanges **145*a*. In examples, the variable focus optical element housing 143 is physically coupled to the rear lens assembly 145 via arms 143*a* of the housing 143. The variable focus optical element housing 143 may be physically coupled to the mounting flanges 145*a* by an adhesive or other suitable coupling mechanism. The autofocus system 142 is disposed in, and protected by, the variable focus optical element housing 143 to prevent damage to the autofocus system 142. In examples, the autofocus system 142 includes a variable focus optical element disposed along the optical axis F to receive light from the compensator lens assembly 150. The variable focus optical element of the autofocus system may include a voice coil motor, liquid lens, T-lens, or another optical element that has a variable focal plane or focal distance for tuning the flange focal length of the far imaging system 140. The autofocus system 142 and associated variable focus optical element may be entirely, or partially, disposed inside of the variable focus optical element housing 143, and, as such, the housing 143 supports the position of the autofocus system 142** along the optical axis F.

The compensator lens assembly 150 is disposed along the far imaging axis F to receive light from the far imaging FOV of the assembly 100. The compensator lens assembly 150 includes a compensator lens 153 that is positioned along the optical axis F to tune the focal flange length of the far imaging system 140 optical assembly. In examples, the compensator lens 153 is a glass lens having a positive optical power, and the glass lens may have an anti-reflective coating, an infrared-cut coating, a bandpass coating, or another optical coating disposed thereon to reduce reflections or filter light propagating through the lens. The compensator lens assembly 150 includes a compensator lens housing 152 that contains the compensator lens 153. In examples, the compensator lens 153 is partially or entirely disposed inside of the compensator lens housing 152. The compensator lens housing 152 supports a position of the compensator lens 153 along the optical axis, and the compensator lens housing 152 may be used to tune the position of the compensator lens both along the far imaging axis F, and laterally along dimensions orthogonal to the far imaging axis F. The compensator lens housing 152 is physically coupled to the variable focus optical element housing 143 to maintain a position of the compensator lens 143 relative to the optics of the variable focus assembly 142 and the fixed focus optical group 154, to focus an image of a FOV onto the far imaging sensor 147.

In examples, the compensator lens housing 152 is physically coupled to the variable focus optical element housing by an adhesive 151, a mount, or other coupling mechanisms. The adhesive 151 reduces the overall size of the far imaging system 140 and removes the requirement for other lens holders or physical mounting structures. The adhesive 151 also allows for active tuning and alignment of the flange focal length of the far imaging assembly 140 after the variable focus assembly 144, fixed focus optical group, and rear lens assembly 145 have been positioned along the far imaging axis F to provide an image to the far imaging sensor 147. By using the adhesive 151, the compensator lens assembly 150 may be manually, or automatically, adjusted by a person or machine to tune the flange focal plane of the far imaging assembly 140 onto the far imaging sensor 147. Using a thin bead layer of the adhesive 151 also provides sealing between the compensator lens assembly 150 and the variable focus assembly 144 which protects the optics of the variable focus assembly 144 (e.g., autofocus system 142, liquid lenses, T-lenses, voice coil motor, etc.) from dust, fluids, or debris from entering the system and polluting images. Typically, active alignment of optics may require tuning of the flange focal plane by tuning the focal length of a variable focus optic which reduces the overall usable focal range of an optical system. Using the compensator lens 150 to tune the flange focal length preserves the widest range of focal planes for the far imaging system 140 by compensating for any focal plane errors including focal distance, plane tilt, or lateral position, to provide a focused image at the far imaging sensor 147 preserving the focal range of the system 140. Tipping and tilting longer optical systems with multiple lenses and focus tunable optics often is limited due to the housing structures and surrounding physical chassis and structures. Therefore, the compensator lens assembly 150 allows for a wide range of focus plane and image tuning over other comparable optical systems. Also, use of the compensator lens assembly 150 allows for using larger physical mounts and couplers such as the flanges **143*a* which allows for use of a larger compensator lens 153. The larger lens 153 collects more light than a smaller lens, which provides higher resolution, or higher quality images across multiple imaging and scanning system metrics. The compensator lens 153 further allows for consistent system performance across devices that include the far imaging system 140 described, resulting in high quality consistent imaging assemblies 100. Due to the use of multiple features, such as the dual-diameter lens barrel, small machined baffle 156, stable positioning of optics using flanges 145*a* and tabs 145*b*, and adhesive 151, the overall dimensions of the far imaging system may be 20 mm along the optical axis F, and with lateral depth and width of 10 mm by 9 mm or smaller. The described mounting features (e.g., mounting flanges 143***a*, tabs 145*b*, etc.) reduce the risk of the far imaging system 140 from dislocating or misaligning in the assembly 100. Further, the adhesives and mounting pads secure the other systems, and elements of systems, in place within the assembly. It is envisioned that other physical mounts, features, and adhesives, screws, or other physical couplers may be used to mount elements and prevent any misalignment or ejection of elements during a physical impact event (e.g., falling onto a floor or surface, bumped, jostled during shipping, etc.). For example, the first chassis 105 may be further physically secured to the far imaging system 140 and second chassis 110 by an adhesive between the first chassis 105 and far imaging system 140 and/or second chassis 110 to increase the physical stability of the first chassis and element disposed therein.

Figure 9:
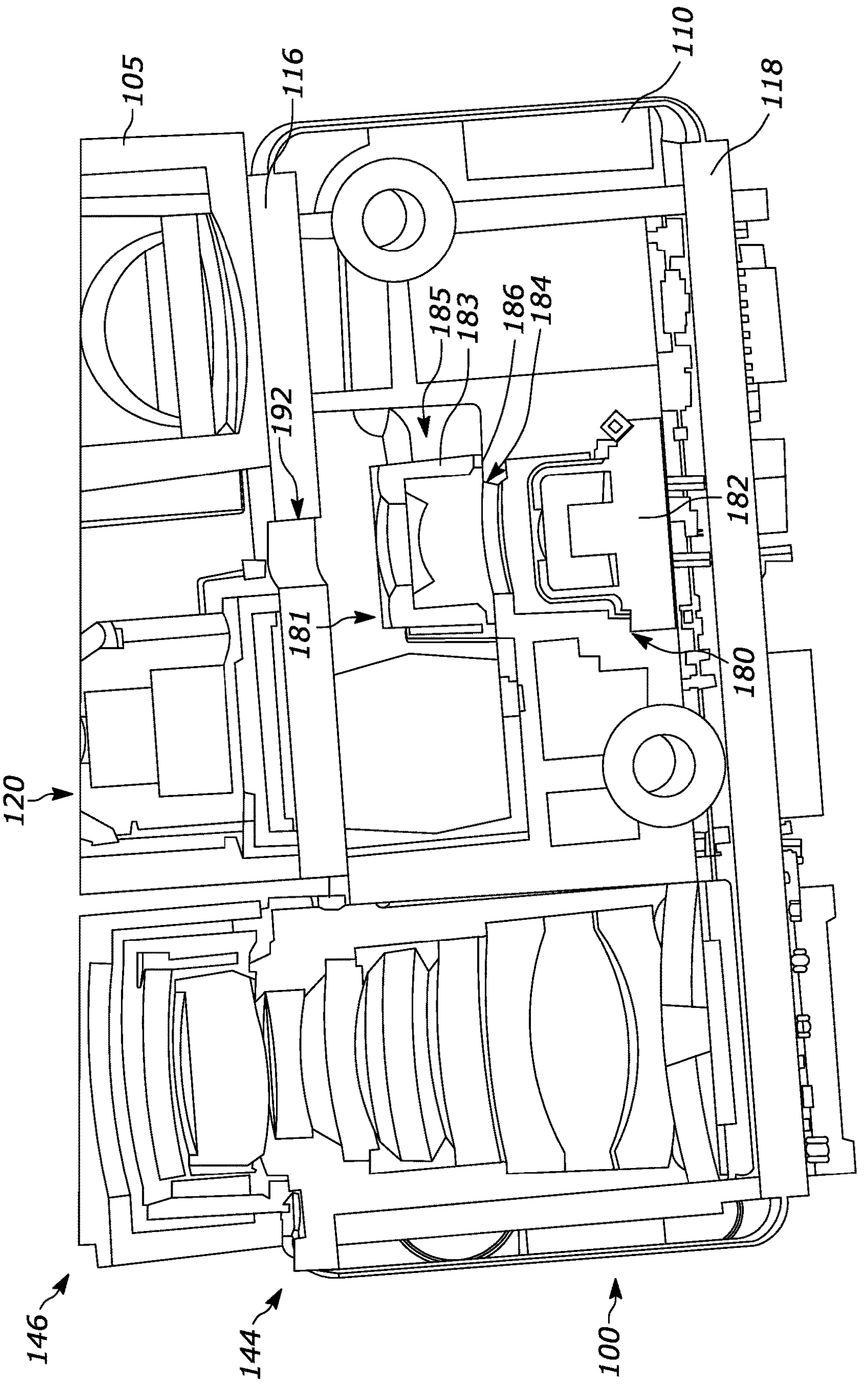
FIG. 9 illustrates a cross-sectional perspective view of a portion of the example imaging assembly of FIGS. 1-8 in accordance with various embodiments.
Figure 10:
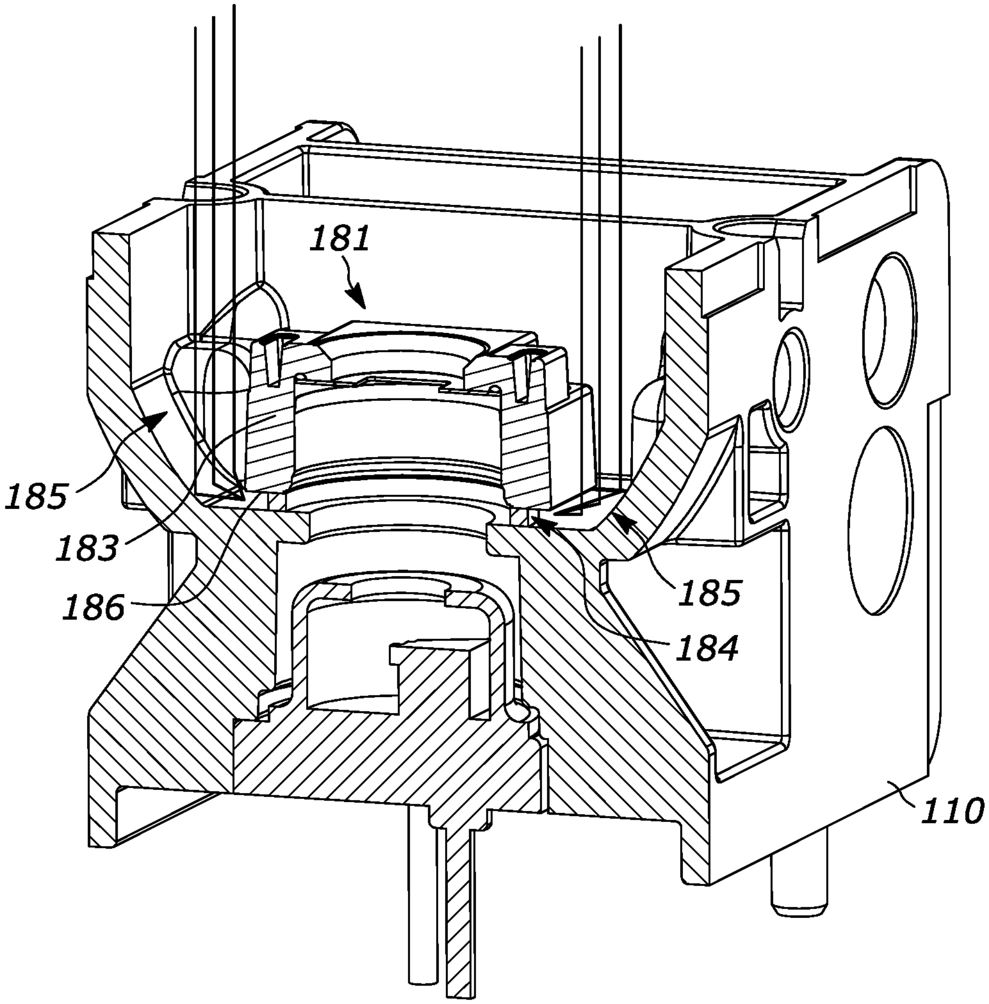
FIG. 10 illustrates a close-up cross-sectional perspective view of a portion of an example aiming system that may be implemented in the example imaging assembly of FIGS. 1-9 in accordance with various embodiments.

With reference to FIGS. 1, 9, and 10, particulars of the aiming system 180 and its environment are herein described. As previously noted, the aiming system 180 includes an aiming source 182 and other components such as a collimating lens or lens assembly 183 that extend along the axis A in a first direction. The aiming source 182 generates light to assist with identifying the FOV. The collimating lens 183 is provided to control the light emitted from the aiming source 182. The pattern generator (or DOE) 188 generates a cosmetic pattern from the emitted light to assist with identifying the FOV. As previously noted, the aiming system 180 is at least partially disposed within the cavity or confined volume 181 of the second chassis 110. More specifically, the confined volume 181 of the chassis 110 includes a chassis mounting portion 184 and a redirecting region 185 that at least partially surrounds the chassis mounting portion 184. In the illustrated examples, the chassis mounting portion 184 is in the form of a surface that receives and retains portions of the aiming system 180.

The redirecting region 185 is in the form of a surface or sidewall that may redirect light or electromagnetic radiation propagating in a first direction (i.e., in a direction parallel to the axis A) to a second direction (i.e., in a direction towards the axis A). More specifically, as illustrated in FIG. 10, the redirecting region 185 is in the form of a number of curved surfaces. In some examples, such surfaces may be generally parabolic in shape. However, other examples and arrangements are possible such as, for example, a generally planar, angled surface, or a surface having any desired curvature or shape. In some examples, the redirecting region 185 may be reflective or semi-reflective to facilitate the redirection of light or electromagnetic radiation. In these and other examples, the redirecting region 185 may have other surface treatments resulting in a desired surface smoothness. For example, the redirecting region 185 may have a surface roughness of approximately 0.8 microns (as compared with the remainder of the chassis 110 having a surface roughness of between approximately 1.6 and 3.2 microns. As a result, the redirecting region 185 may have a relatively smoother surface than the remainder of the chassis 110 to promote electromagnetic radiation reflections. It is to be appreciated that the redirecting region 185 may have different and/or additional surface treatments applied thereto to result in further reduced roughness values.

The adhesive 186 is used to couple, secure, and/or otherwise retain components with the chassis 110. It is to be appreciated that while not illustrated, the adhesive 186 may be provided to couple, secure, and/or otherwise retain any number of additional components. More specifically, the adhesive 186 may be used to couple the collimating lens 183 with the chassis 110 at the chassis mounting portion 184. In some examples, the adhesive 186 may first be coupled with the chassis mounting portion 184, whereupon the collimating lens 183 is placed upon the adhesive 186, but in other examples, the adhesive 186 may first be coupled with the collimating lens 183, whereupon the collimating lens 183 and the adhesive 186 may be placed on the chassis mounting portion 184. In either of these or other arrangements, proper placement of the collimating lens 183 with respect to the chassis is desired to achieve high performance of the aiming system 180. In some examples, an active alignment procedure is performed to ensure the collimating lens 183 is properly disposed with respect to the aiming source 182.

In some examples, the collimating lens 183 may be constructed from a plastic material such as, for example, polycarbonate. In some examples, the collimating lens 183 may have an opaque housing or body to achieve improved optical performance. An opaque collimating lens 183 may assist with blocking stray light from entering into and/or escaping from the aiming system 180 as compared to previous designs using transparent and/or translucent components.

Upon the collimating lens 183 (or any other component of the unit 100) being properly placed and aligned with the chassis mounting portion 184, a curing process is initiated to cause the adhesive 186 to secure the collimating lens 183 at the desired location. This process may be a single or multi-stage procedure whereby electromagnetic ration (e.g., ultraviolet ("UV") light or any other light source) is directed towards the adhesive to cure. While previous systems using transparent or translucent collimating lenses were capable of performing such curing by simply directing the electromagnetic radiation in an axial direction along axis A, whereupon the electromagnetic radiation passes through the transparent or translucent collimating lens and reach the adhesive 186, in examples where the collimating lens 183 (or other component) is constructed from an opaque material, such a construction may block and/or otherwise prevent or obstruct the electromagnetic radiation from reaching the adhesive. Further, given the compact design of the unit 100, it may not be possible to direct the electromagnetic radiation at an angle in an attempt at contacting the adhesive. However, because the presently-described unit 100 incorporates an aiming cavity 181 having a redirecting region 185, light, heat, or other electromagnetic radiation may be directed into the cavity 181 in a direction parallel to the axis A towards the redirecting region 185, whereupon the shape, arrangement, and/or surface treatment(s) applied thereto causes such light, heat, or other electromagnetic radiation to reflect towards the adhesive 186 to initiate curing.

As previously noted, in some examples, the redirecting region 185 may have a generally parabolic shape. Such an arrangement of the redirecting region 185 may be dimensioned so that the focal point of the parabola (or other shape) is positioned at the location of the adhesive 186. In these and other arrangements, the redirected or otherwise reflected electromagnetic radiation will contact the adhesive 186 and cause it to cure.

It is appreciated that in some forms, the curing process may be completed in a single step. However, in other examples, the curing process may include multiple steps, where electromagnetic radiation is first directed towards the redirecting region 185 to initiate curing, and a second curing process may occur thereafter. In some examples, the collimating lens 183 may be further positioned and/or aligned between these two curing steps. Further, in some examples, the second curing step may include applying a heat source generated by a heating element to the aiming cavity 181. In other examples, electromagnetic radiation may again be directed towards the redirecting region during this second step. Other examples are possible.

So arranged, the scanning unit 100 may incorporate any number of redirecting regions to assist with securing any number of desired components requiring precise alignment. Such an arrangement is of particular benefit in the present system which occupies a reduced overall volume and accordingly has smaller component cavities. Advantageously, a sealed cavity may be less susceptible to contamination of internal surfaces which may otherwise impact performance of the aiming system 180. Such contaminants may include foreign objects and/or moisture. A sealed cavity may additionally provide a barrier from external light sources from entering the aiming system 180, the aiming system 180 to other systems, and stray light generated by the aiming system 180 from producing artifacts from the engine 100.

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions.

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A scan engine for capturing at least one image of an object appearing in an imaging field of view (FOV), comprising:

a chassis including a chassis body defining at least one confined volume, the chassis body including a chassis mounting portion and a redirecting region adapted to at least partially surround the chassis mounting portion;

an adhesive material adapted to be disposed on the chassis mounting portion; and an aiming system adapted to generate a cosmetic pattern to assist with identifying the FOV, the aiming system at least partially disposed within the at least one confined volume of the body, the aiming system extending along a longitudinal axis in a first direction, wherein at least a portion of the aiming system is adapted to engage the adhesive material to be at least partially retained within the at least one confined volume of the body;

wherein upon directing electromagnetic radiation towards the at least one confined volume, the redirecting region is adapted to redirect the electromagnetic radiation towards the adhesive material to initiate a curing process, wherein the redirecting region comprises at least one surface having a parabolic shape forming a focal point at the adhesive material.

2. The scan engine of claim 1, wherein the aiming system is adapted to block the electromagnetic radiation traveling in a direction parallel to the longitudinal axis of the aiming system from contacting the adhesive material.

3. The scan engine of claim 1, wherein the redirecting region comprises at least one surface having a surface roughness of approximately 0.8 microns.

4. The scan engine of claim 1, wherein the aiming system comprises an opaque lens housing formed from a polycarbonate material.

5. The scan engine of claim 1, further comprising an imaging assembly adapted to be operably coupled with the body of the chassis.

6. The scan engine of claim 1, wherein the electromagnetic radiation comprises at least one of a light source or a heating element.

* * * * *